(12) United States Patent
Yen et al.

(10) Patent No.: US 7,298,712 B2
(45) Date of Patent: Nov. 20, 2007

(54) WIRELESS NETWORK DEVICE WITH DATA STORAGE

(75) Inventors: An-Yu Yen, Taipei (TW); Kuang-Ju Shiao, Taipei (TW); Yu-Hsiang Lin, Taipei (TW); Yu-Hsiang Chen, Taipei (TW)

(73) Assignee: Microlink Communications Inc., Taipei (TW)

( * ) Notice: Subject to any disclaimer, the term of this patent is extended or adjusted under 35 U.S.C. 154(b) by 632 days.

(21) Appl. No.: 10/802,789

(22) Filed: Mar. 18, 2004

(65) Prior Publication Data

US 2005/0207363 A1  Sep. 22, 2005

(51) Int. Cl.
*H04B 7/00* (2006.01)
(52) U.S. Cl. .................... 370/310; 712/217
(58) Field of Classification Search ............. 370/310; 712/217
See application file for complete search history.

(56) References Cited

U.S. PATENT DOCUMENTS

2005/0207363 A1* 9/2005 Yen et al. .................. 370/310
2006/0095732 A1* 5/2006 Tran et al. .................. 712/217

* cited by examiner

*Primary Examiner*—William D. Cumming
(74) *Attorney, Agent, or Firm*—Rosenberg, Klein & Lee

(57) ABSTRACT

A wireless network device with data storage is provided that utilizes a wireless connection to communicate with a LAN. The wireless network device with data storage includes a control unit, a memory element and a wireless communication module. The control unit includes a base-band processor, an RF interface, an external memory interface and a host device interface, wherein the base-band processor is adapted to process all data input/output through each interfaces. The RF interface connects the wireless communication module with the control unit, the external memory interface connects the memory element with the control unit, and the host device interface makes the control unit connect with an electronic device. The wireless communication module is able to either transmit or receive wireless signals from other electronic devices. The memory element is divided into two storage areas, one used for storage of the driver program for the control unit, the other for storage of user data.

5 Claims, 3 Drawing Sheets

WIRELESS NETWORK DEVICE WITH DATA STORAGE

BACKGROUND OF THE INVENTION

1. Field of the Invention

The invention relates to a wireless network device. More particularly, the invention relates to a wireless network device that can be used to store data for a user.

2. The Related Art

With the development of the informatization society, communication is very important. At the same time, the means of communication tends to diversification. Communication through Internet has become an important part in the life and work of the people. But the traditional means of connecting with Internet needs a cable for transferring data that connects a host device with LAN (local area network), which constrains the movement of the host device. The user cannot transfer the host device freely. Besides, the common network device generally includes a memory element. However the memory element is only used to store program data that support the network communication, at the same time, the capacity of the memory element is so small that the memory element is not provided for storing data.

Furthermore, for the constraint of the cable, the use of the network device is limited, and it cannot suit to the development tendency of communication. Therefore, there is a need for a wireless network device that can be used to store data for a user.

SUMMARY OF THE INVENTION

An objective of the present invention is to provide a wireless network device with data storage which makes a host device connect with LAN by means of wireless and is used to store data for a user.

To achieve the above objective, the present invention provides a wireless network device with data storage that connects with LAN by means of wireless. The wireless network device with data storage includes a control unit, a wireless communication module and a memory element.

The control unit connects with a wireless communication module and a memory element. The control unit also connects with a host device such as a computer. Therefore, the host device communicates with the AP (access point) of the LAN.

The memory element is divided into two storage areas, one is used to store the driver program data that makes the control unit support the wireless communication such as the IEEE802.11 protocol data; and the other is used to store other data. Therefore, this memory element can be used to directly store data downloaded from the LAN.

The host device interface of the wireless network device with data storage may adopt the USB interface in order to make the wireless network device with data storage connect with different kinds of the host devices such as a note-book computer, a PDA (personal digital assistant) or a digital still camera.

Therefore, the wireless network device with data storage can make a host device connect with the LAN by means of wireless and is used to store data for a user.

BRIEF DESCRIPTION OF THE DRAWINGS

The present invention will be apparent to those skilled in the art by reading the following description of embodiments thereof, with reference to the attached drawing, in which.

DETAILED DESCRIPTION OF THE PREFERRED EMBODIMENT

Figure 1:
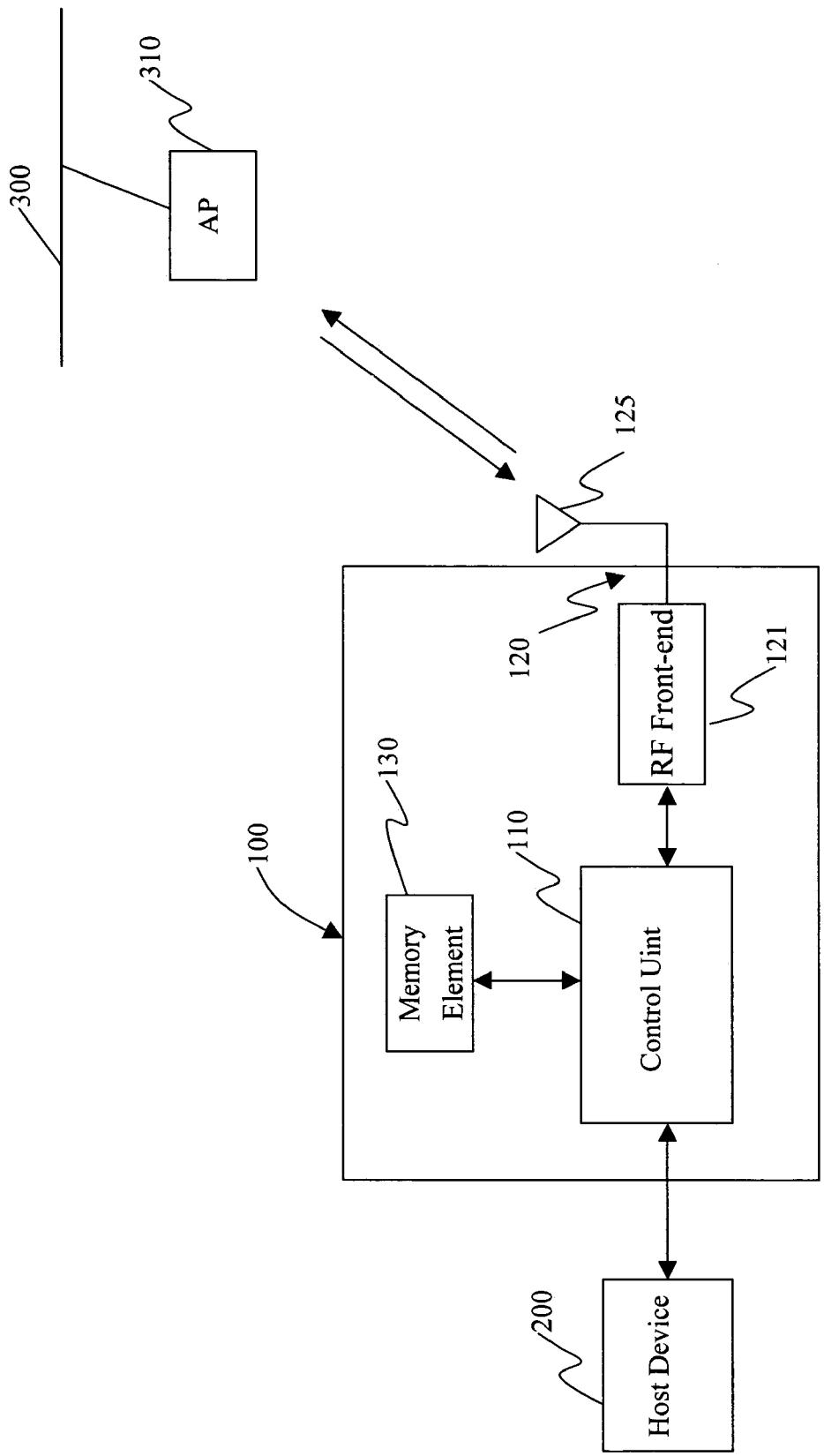
FIG. 1 is a block diagram of the wireless network device with data storage according to the present invention.

With reference to FIG. 1, a wireless network device with data storage 100 of the present invention is disclosed. The wireless network device with data storage 100 connects with LAN 300 by means of wireless. The wireless network device with data storage 100 includes a control unit 110, a wireless communication module 120 and a memory element 130. The control unit 110 connects with a wireless communication module 120 and a memory element 130. The control unit 110 may connects with a host device 200 such as a computer. Therefore, the host device 200 can communicate with the AP (access point) 310 of the LAN 300. Besides, the wireless network device with data storage 100 can also be used to extend the memory of the host device 200.

Figure 2:
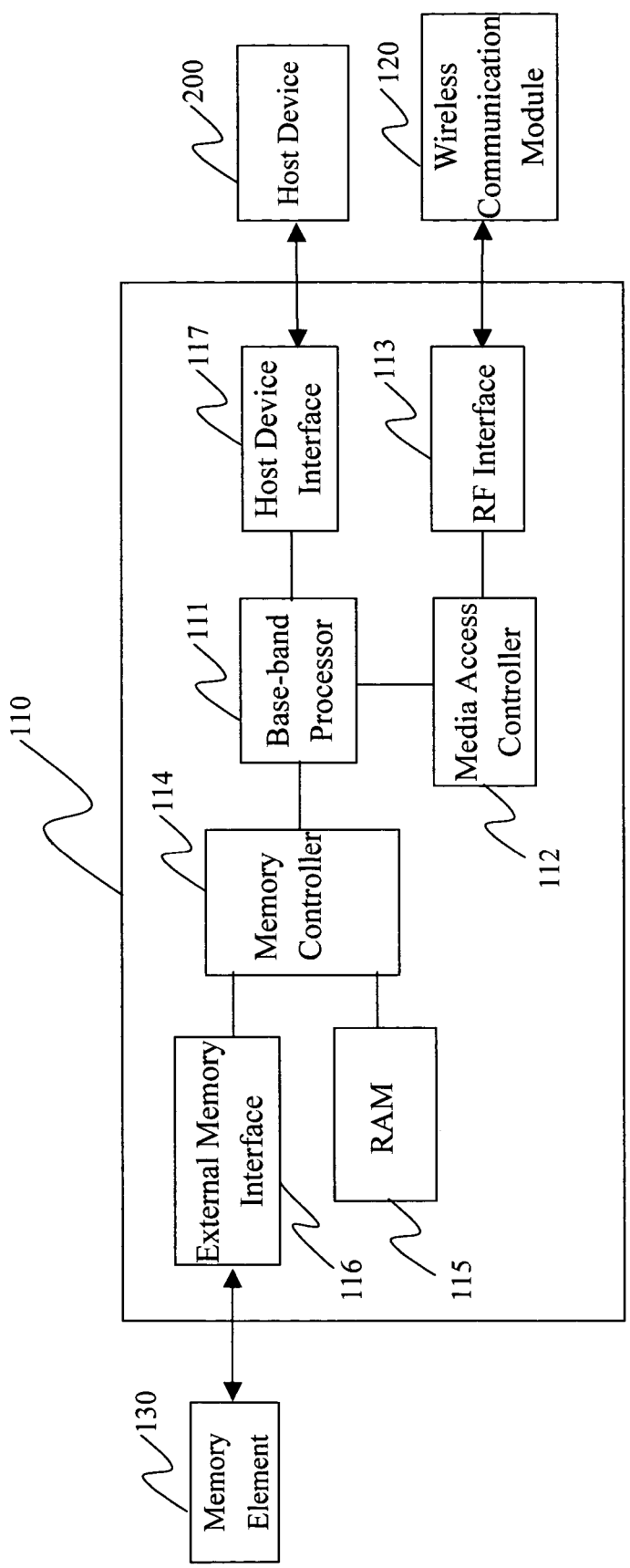
FIG. 2 is a block diagram of the control unit of the wireless network device with data storage according to the present invention.

With reference to FIG. 2, the block diagram of the control unit 110 of the wireless network device with data storage 100 is shown. The control unit 110 further composes a base-band processor 111, a media access controller 112, a RF interface 113, a memory controller 114, a RAM (Random Access Memory) 115, an external memory interface 116 and a host device interface 117. The base-band processor 111 connects with the media access controller 112 and the host device interface 117. The base-band processor 111 controls the transferring of data of the host device interface 117. The RF interface 113 connects with the media access controller 112 and the wireless communication module 120. Through the RF interface 113, the wireless signal is inputted the media access controller 112 or outputted the wireless communication module 120. Besides, the base-band processor 111 further connects with the memory controller 114 and controls the RAM 115 and the external memory interface 116 through the memory controller 114. The RAM 115 is used to store temporary data that the base-band processor 111 produces in the run. The external memory interface 116 connects with the memory element 130.

The memory element 130 adopts the non-volatile semiconductor memory such as Flash memory. The memory element 130 is divided into two storage areas, one is used to store the driver program data that can make the control unit support the wireless communication such as the IEEE802.11 protocol data, this area occupies the lower address part of the memory element 130; and the other is used to store other data for a user, therefore, this area is not only used to extend the capacity of the host device 200, but also can be used to directly store data downloaded from the LAN 300, and this area occupies the upper address part of the memory element 130.

Additionally, the memory element 130 can include two pieces of independent memories, one of which is used to store the driver program data that makes the control unit support the wireless communication, and the other is used to store other data for a user. Both of the two memories adopt the non-volatile semiconductor memory, such as Flash memory.

Figure 3:
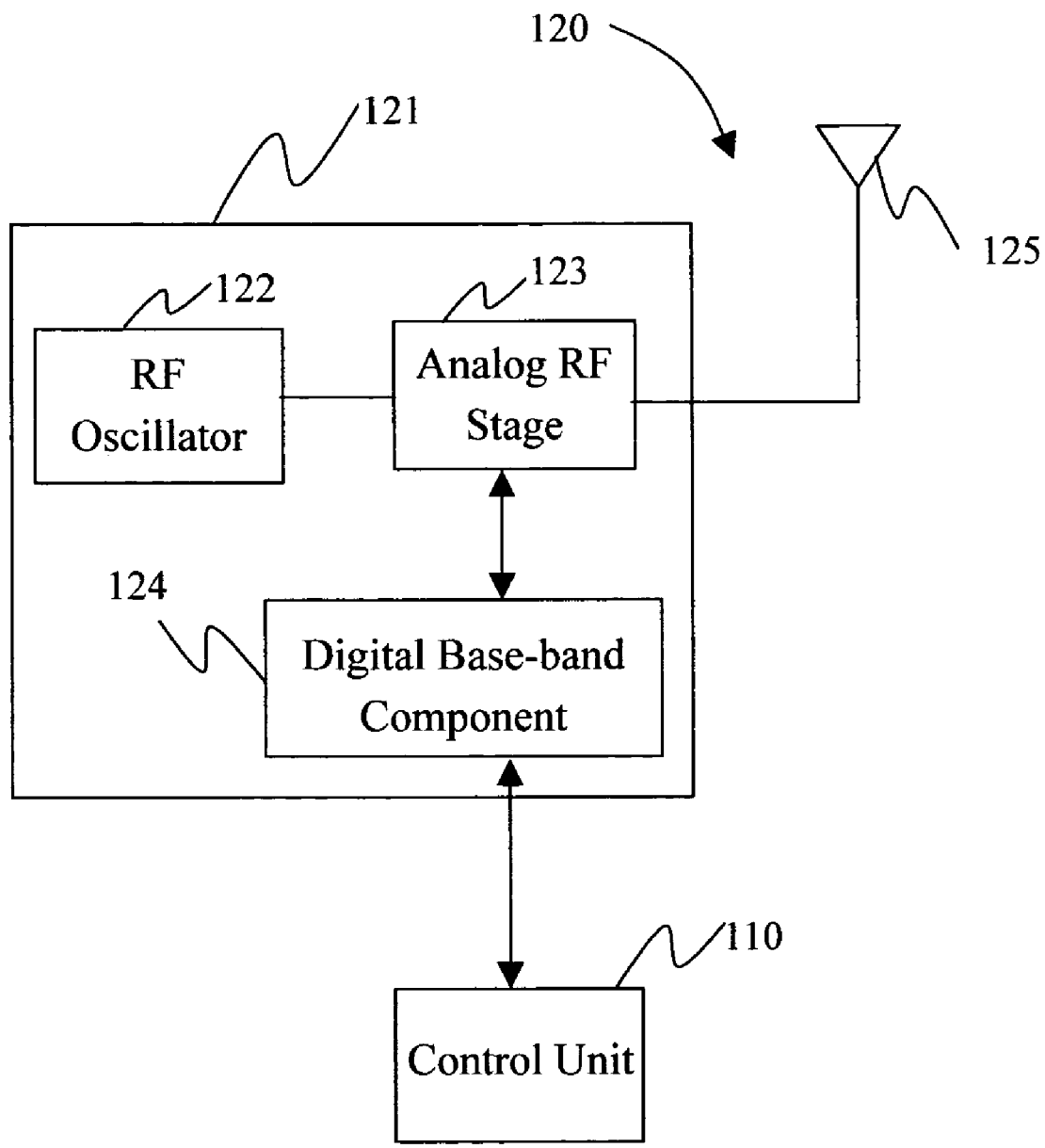
FIG. 3 is a block diagram of the wireless module of the wireless network device with data storage according to the present invention.

With reference to FIG. 3, the block diagram of the wireless communication module 120 of the wireless network device with data storage 100 is shown. The wireless communication module 120 is used to receive and/or transmit the wireless signal, therefore, the host device 200 can communicate with the LAN by means of wireless. IEEE 802.11b or IEEE 802.11a technology accepted communication protocol is used in the wireless communication module 120, or other technology accepted communication protocol such Blue-tooth technology is also adopted. The wireless communication module 120 includes an antenna 125 and an RF Front-end 121. The RF Front-end 121 connects with the RF interface 113 of the control unit 110 by an RS-232 interface or a USB interface. The RF Front-end 121 further comprises an RF oscillator 122, an analog RF stage 123 and a digital base-band component 124. When the wireless signal is transmitted, a digital base-band component 124 receives the signal from the control unit 110 and outputs the digital signal to the analog RF stage 123. The analog RF stage 123 converts the digital signal to the analog signal under the control of waves that come from the RF oscillator 122. The antenna 125 transmits the wireless signal according the analog signal under the control the analog RF stage 123. If the wireless signal is received, the analog RF stage 123 converts the wireless signal received by the antenna 125 into the analog signal, then the a digital base-band component 124 receives the analog signal and converts the analog signal into the digital signal, at last the digital signal is inputted into the control unit 110.

The following will show how the host device 200 equipped with the wireless network device with data storage 100 communicates with the AP 310 of the LAN 300. The host device 200 transmits the data signal to the base-band processor 111 of the control unit 110 through the host device interface 117. The base-band processor 111 receives and processes the data signal according the wireless communication protocol and driver program, and the wireless communication protocol and driver program data are stored in the memory element 130 and transferred to the base-band processor 111 through the external memory interface 116. The data signal being processed by the base-band processor 111 is inputted to the media access controller 112, and then the data signal is transferred into the wireless communication module 120 through the RF interface 113. Therefore, the host device 200 can transfer the data to the LAN 300; on the contrary, the host device 200 can download the data from the LAN 300 through the AP 310 through the wireless network device with data storage 100.

Furthermore, when the user utilizes the wireless network device with data storage 100 to store data, the host device 200 transfers the data into the base-band processor 111 of the control unit 110, then the data are inputted into the memory element through the memory controller 114 and the external memory interface 116. The user also makes the data download from the LAN 300 stored in the memory element 130 under the control of the control unit 110, or send the data in the memory element 130 to the LAN 300 under the control of the control unit 110.

In the present invention, the host device interface 117 of the wireless network device with data storage 100 may adopt the USB interface in order to make the wireless network device with data storage 100 connect with different kinds of the host devices such as a note-book computer, a PDA (personal digital assistant) or a digital still camera. Besides, because the USB interface has the power bus, the host device 200 supplies the power to the wireless network device 100, as the result, the separate supply circuit is not needed in the wireless network device 100, therefore, the structure of the wireless network device with data storage 100 is simple and the cost is also lower.

According to the above-mentioned description about the wireless network device with data storage 100, it is possible to provide a wireless network device with data storage 100 which not only overcomes the constraint of the cable to make the host device 200 communicate with LAN 300 by means of wireless, but also be used to store data for a user. Therefore, the wireless network device with data storage 100 makes the user communicate conveniently and satisfy the demand of the users.

Although the present invention has been filly described by way of the example with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A wireless network device with data storage, comprising:

a control unit including a base-band processor, a media access controller, a RF interface, a memory controller, RAM (Random Access Memory), an external memory interface and a host device interface; the base-band processor connecting with the media access controller, the host device interface and the memory controller for processing all data input/output through each interfaces, the RF interface connecting with the media access controller, the RAM and the external memory interface connecting with the memory controller, the RAM storing temporary data that the base-band processor produces in the run; a wireless communication module connecting with the RF interface through which the wireless signals are transmitted/received; and a memory element connecting with the external memory interface being divided into two storage areas, one of which storing the driver program, and the other storing data.

2. The wireless network device with data storage as claimed in claim 1, wherein the area that is used to store data occupies the upper address of the memory element.

3. The wireless network device with data storage as claimed in claim 1, wherein the memory element is Flash Memory.

4. The wireless network device with data storage as claimed in claim 1, wherein the memory element includes two pieces of memories, one of which stores the driver program, and the other stores data.

5. The wireless network device with storage as claimed in claim 4, wherein both two pieces of memories are Flash Memory.

* * * * *